United States Patent [19]

Soroka

[11] Patent Number: 5,002,906
[45] Date of Patent: Mar. 26, 1991

[54] PROCESS FOR MAKING MODIFIED ALUMINA FIBERS

[75] Inventor: Anthony J. Soroka, West Chester, Pa.

[73] Assignee: E. I. Du Pont de Nemours and Company, Wilmington, Del.

[21] Appl. No.: 414,413

[22] Filed: Sep. 29, 1989

[51] Int. Cl.$^5$ ............................................. C04B 35/02
[52] U.S. Cl. ..................................... 501/95; 501/127; 423/625; 423/608
[58] Field of Search ........................ 501/95, 105, 127; 423/265, 275, 625, 628, 608

[56] References Cited

U.S. PATENT DOCUMENTS 3,808,015  4/1974  Seufert .................................. 501/95
4,753,904  6/1988  Wolfe .................................. 501/105

FOREIGN PATENT DOCUMENTS 202239  9/1984  Japan .
186517  8/1986  Japan .

*Primary Examiner*—William R. Dixon, Jr.
*Assistant Examiner*—Paul Marcantoni

[57] ABSTRACT

Ceramic fibers of alumina modified with zirconia or hafnia derived from soluble salts of the metal are made by first polymerizing a mixture of alumina and aqueous aluminum chlorohydroxide before addition of the metal oxide precursor. Subsequent concentration and spinning steps are carried out at low temperatures.

9 Claims, No Drawings

PROCESS FOR MAKING MODIFIED ALUMINA FIBERS

BACKGROUND OF THE INVENTION

This invention relates to an improved process for making ceramic fibers which contain alumina modified with one or more oxides of zirconium or hafnium.

Alumina fibers have been recognized as useful in high temperature applications for some time. Seufert, U.S. Pat. No. 3,808,015 is an early reference describing ceramic fibers which are predominantly alumina. Subsequently, other workers have obtained improved fiber properties by modifying the alumina with metal oxides such as zirconia or more preferably partially stabilized zirconia, hafnia, or combinations of these oxides. See Wolfe, U.S. Pat. No. 4,753,904 and U.S. patent application Ser. No. 07/100,760.

U.S. Pat. No. 4,753,904 teaches the use of zirconyl acetate as the precursor of choice in the process for making modified alumina fibers. In a typical process described in the '904 patent alumina powder slurry, zirconyl acetate, aluminum chlorohydroxide and an yttrium chloride solution are combined, mixed overnight and concentrated under vacuum with heating. The '904 patent does not report temperatures for the concentration step. The '015 patent reports that the concentration step can be done at the temperature of a team bath (Example 2) or at 20°-25° C. (Example 8). However, several problems, which are not encountered in the production of pure alumina fibers, arise in the process of producing fibers of alumina modified with zirconia and/or hafnia. Spin mix foaming readily occurs when the metal oxide precursor is the acetate salt. Zirconyl acetate is the commonly available zirconia precursor. Foaming, and the subsequent drying of foamed material in the spin mix container, can lead to plugged spinnerets and fiber breaks. Gel formation in the spin mix is another cause of fiber breaks, loss of yield and variability in fiber properties. Gels readily form in mixtures containing a zirconium or hafnium compound in the presence of an aqueous aluminum compound such as aluminum chlorohydroxide.

One attempt to address these problems is described in Japanese Patent Application Publication No. 61-186517. This reference teaches that gel formation in spin mixes for zirconia containing alumina fiber can be minimized by concentrating the aqueous spin mix at 30° C. or less.

Another approach to the problem is described in Japanese Patent Publication No. 59-202239. This reference teaches boiling gelled mixtures to form a sol, but this changes the nature of the alumina-zirconia mixture, and requires addition of an organic polymer prior to spinning.

This invention provides an improved process for making ceramic fibers of alumina modified by other metal oxides derived from their water soluble precursors.

SUMMARY OF THE INVENTION

In the improved process for producing a fiber of alumina modified with at least one metal oxide which is derived from a water soluble salt of zirconium or hafnium, a mixture of alumina particles and aluminum chlorohydroxide is polymerized by mixing and heating prior to addition of the metal acetate salt. In a preferred embodiment, the polymerization is carried out at a temperature of about 30°-60° C. Then the water soluble metal salt solution is added and the mixture is concentrated. It is preferred that the concentration is done under vacuum at a temperature of 15° to 27° C. When the spin mix has the desired viscosity, preferably 500 to 2000 poise, and solids concentration, preferably 53-56% solids, the mixture is spun, the preferred temperature of the spin mix during spinning being 15°-17° C. In a preferred process, the water soluble salt of zirconium or hafnium is zirconyl acetate or hafnyl acetate. A preferred fiber made by this process comprises alumina and zirconia partially stabilized with yttria.

DETAILED DESCRIPTION OF THE INVENTION

Although use of metal oxides such as zirconia, hafnia and yttria to modify alumina fibers can lead to improved fiber properties, the process for producing such modified fibers presents several problems. Metals such as zirconium and hafnium in the presence of aqueous aluminum compounds have a much greater tendency to produce gels during the polymerization, concentration and spinning steps than is the case when aluminum is the only metal present. Also, a convenient source of the zirconia or hafnia is the acetate salt of the metals. However, these acetate salts have been found to create a foaming problem during the homogenization and initial concentration steps for which the prior art has not offered a solution.

Foam formation is avoided by first completing the polymerization of the aluminum chlorohydroxide-alumina mixture prior to addition of any acetate salt. When the acetate salts are added, foaming formation is minimized or avoided by maintaining the mixtures at the low temperatures described above during the vacuum concentration and spinning steps. Gel formation is avoided in the same manner. Polymerization of the aluminum chlorohydroxide is completed prior to the addition of water soluble salts of zirconium or hafnium, and the mixtures are maintained at low temperatures described above during concentration and spinning.

In order to obtain proper fiber attenuation and viscosity control, the aluminum chlorohydroxide is conveniently polymerized at temperatures in the range of 30° to 60° C. However, if this is done while water soluble zirconium or hafnium salts, particularly the acetate salts are present, gel formation and, if acetates are employed, foaming become a problem. Higher temperatures may be used for the aluminum chlorohydroxide polymerization, but greater care is required to achieve control of the reaction and reproducible results.

After addition of the acetate salts or other water soluble hafnium or zirconium salts, both foaming and gel formation can be avoided by using a low temperature during the concentration step. Foaming of the mixture can lead to formation of a crust of dried material in the vessel which must be removed or the solid material in the crust can interfere with subsequent spinning operations. Gel formation leads to shear thinning and thixotropic behavior of the solutions, poor spinning performance and low quality fibers.

It is preferable to lower the temperature still further after the concentration step and to maintain the lower temperature during the spinning step in order to minimize any further polymerization. If this is not done, spin mix viscosities will rise to levels which will result in slower spinning speeds and impaired fiber properties.

At 15° to 17° C., the spin mix viscosity increase during a spinning operation will rise only one tenth as much as the viscosity of a similar spin mix maintained at 25° C.

Other aspects of the process including spinning and sintering of the fiber are as reported in U.S. Pat. No. 4,753,904 which is incorporated by reference.

EXAMPLE 1

Into a mixing vessel are added 88.5 pounds (40.18 Kg) of alumina particle slurry (50.1% solids) prepared as described in U.S. Pat. No. 4,753,904 and 950 grams of concentrated hydrochloric acid. The mixture is agitated as an amount of aluminum chlorohydroxide 48.52% solids solution equivalent to 31.5 pounds (14.3 Kg) alumina is added slowly. The mixture is homogenized and heated to a temperature of 62° C. over 75 minutes. Thereafter the temperature is reduced and held at about 50° C. for a two hour period with agitation.

The temperature of the mixture is then reduced to 26° C. and zirconyl acetate solution (22.1% solids) equivalent to 30.1 pounds (13.67 Kg) zirconia plus 1.39 Kg $YCl_3.6H_2O$ dissolved in 1.06 Kg water are added.

The temperature of the mixture is further reduced to 18° C. and the pressure is slowly reduced to concentrate the mixture. When the pressure reaches 23 mm Hg the temperature is slowly raised and the pressure is maintained at 16-23 mm Hg. The temperature of the mixture is maintained below 27° C. Concentration continues until the mixture reaches a 55% solids, and a viscosity of 668 poise and 54% solids. When the desired viscosity and solids concentration is reached, the temperature of the mixture is reduced to 15° C.

The mixture is extruded through a spinneret having 4.5 mil diameter holes at the rate of 55-70 grams per minute with a wind-up speed adjusted to attenuate the fibers to achieve a denier per filament of 7.2-7.4 (dry). The fibers are further dried, volatiles removed, and are sintered as in U.S. Pat. No. 4,753,904.

EXAMPLE 2

Into a mixing vessel are added 88.5 pounds (40.18 Kg) of alumina particle (51.4% solids slurry) prepared as described in U.S. Pat. No. 4,753,904 and 890 grams of concentrated hydrochloric acid. The mixture is agitated as an amount of aluminum chlorohydroxide 48.56% solids solution equivalent to 27.8 pounds (12.6 Kg) alumina is added slowly. The mixture is homogenized and heated to a temperature of 62° C. over 100 minutes. Thereafter the temperature is reduced to 50° C. over a period of 220 minutes period with agitation. The temperature of the mixture is then reduced to 25° C. and zirconyl acetate solution (22.3% solids) equivalent to 33.8 pounds (15.36 Kg) zirconia plus 1.565 Kg $YCl_3.6H_2O$ dissolved in 1.0 Kg water are added.

The temperature of the mixture is further reduced to 20° C. and the pressure is slowly reduced to concentrate the mixture. When the pressure reaches 23 mm Hg the temperature is slowly raised and the pressure is maintained at 14-23 mm Hg. The temperature of the mixture is maintained below 27° C. Concentration continues until the mixture reaches a viscosity of 892 poise and 54.6% solids. When the desired viscosity and solids concentration is reached, the temperature of the mixture is reduced to 15° C.

The mixture is extruded through a spinneret having 5 mil diameter holes at the rate of 58-88 grams per minute with a wind-up speed adjusted to attenuate the fibers to achieve a denier per filament of 7.2-7.4 (dry). The fibers are further dried, volatiles removed and are sintered as in U.S. Pat. No. 4,753,904.

COMPARATIVE EXAMPLE 1

A spin mix is prepared using the same starting materials in the same mixture ratios as in EXAMPLE 1. During the vacuum concentration the spin mix reaches a temperature of 37° C. for a period of 45 minutes. At a viscosity of 660 poise the solids concentration is 52.4%. The mixture exhibits shear thinning and thixotropic behavior which results in very poor spinning performance and low quality precursor fiber.

What is claimed is:

1. In a process for producing a ceramic fiber of alumina and at least one additional metal oxide selected from the group of zirconia and hafnia by polymerizing, concentrating and spinning a mixture of alumina, aluminum chlorhydroxide and at least one metal oxide precursor selected from the group of water soluble salts of zirconium and hafnium, the improvement comprising polymerizing a mixture of alumina and aluminum chlorhydroxide followed by addition of the metal oxide precursor to the polymerized mixture of alumina and aluminum chlorhydroxide and concentrating and spinning the resulting mixture.

2. The process of claim 1 wherein the metal oxide precursor is selected from the group of zirconyl acetate and hafnyl acetate.

3. The process of claim 1 wherein the polymerizing is conducted at a temperature of from about 30° to 60° C.

4. The process of claim 1 wherein the concentrating is carried out at a temperature of from 15° to 27° C.

5. The process of claim 1 wherein the polymerizing is conducted at a temperature of from 30° to 60° C., and the concentrating is carried out at a temperature of from 15° to 27° C.

6. The process of claim 1, 2, 3, 4 or 5 wherein the polymerized concentrated mixture is maintained at a temperature of 15°-17° C. during spinning.

7. The process of claim 1, 2, 3, 4 or 5 wherein the polymerized concentrated mixture has a solids content of 53-56%, a viscosity of 500 to 2000 poise and is maintained at a temperature of 15°-17° C. during spinning.

8. The process of claim 1, 2, 3, 4 or 5 wherein the fiber contains alumina, zirconia and yttria, and wherein the polymerized concentrated mixture is maintained at a temperature of 15°-17° C. during spinning.

9. The process of claim 1, 2, 3, 4 or 5 wherein the fiber contains alumina, zirconia and yttria, and wherein the polymerized concentrated mixture has a solids content of 53-56%, a viscosity of 500 to 2000 poise and is maintained at a temperature of 15°-17° C. during spinning.

* * * * *